COMPUTING APPARATUS FOR PERFORMING MULTIPLICATION AND DIVISION

Filed April 20, 1962 5 Sheets-Sheet 1

INVENTORS
MAURICE HENRI FERNAND GIOT
BERNARD JOBART
CHARLES ROGER FEVROT
JEAN MEYER
BY
ATTORNEYS

COMPUTING APPARATUS FOR PERFORMING MULTIPLICATION AND DIVISION

Filed April 20, 1962 5 Sheets-Sheet 2

INVENTORS
MAURICE HENRI FERNAND GIOT
BERNARD JOBART
CHARLES ROGER FEVROT
JEAN MEYER

BY
Pennie Edmonds Morton Barrows & Taylor
ATTORNEYS

COMPUTING APPARATUS FOR PERFORMING MULTIPLICATION AND DIVISION

Filed April 20, 1962 5 Sheets-Sheet 3

INVENTORS
MAURICE HENRI FERNAND GIOT
BERNARD JOBART
CHARLES ROGER FEVROT
JEAN MEYER
BY
ATTORNEYS

June 7, 1966 M. H. F. GIOT ET AL 3,255,340

COMPUTING APPARATUS FOR PERFORMING MULTIPLICATION AND DIVISION

Filed April 20, 1962 5 Sheets-Sheet 4

INVENTORS
MAURICE HENRI FERNAND GIOT
BERNARD JOBART
CHARLES ROGER FEVROT
JEAN MEYER

BY *[signature]*

ATTORNEYS

June 7, 1966 M. H. F. GIOT ET AL 3,255,340

COMPUTING APPARATUS FOR PERFORMING MULTIPLICATION AND DIVISION

Filed April 20, 1962 5 Sheets-Sheet 5

INVENTORS
MAURICE HENRI FERNAND GIOT
BERNARD JOBART
CHARLES ROGER FEVROT
JEAN MEYER

BY

ATTORNEYS

United States Patent Office 3,255,340
Patented June 7, 1966

3,255,340

COMPUTING APPARATUS FOR PERFORMING MULTIPLICATION AND DIVISION

Maurice Henri Fernand Giot, Bernard Jobart, and Charles Roger Fevrot, Paris, and Jean Meyer, Neuilly-sur-Seine, France, assignors to S.A.T.A.M. Societe Anonyme pour Tous Appareillages Mecaniques, Paris, France, a French company, and Sud-Aviation Societe Nationale de Constructions Aeronautiques, Paris, France, a French company Filed Apr. 20, 1962, Ser. No. 189,167
Claims priority, application France, Apr. 21, 1961, 859,605
10 Claims. (Cl. 235—160)

The present invention pertains to electrical apparatus for performing the multiplication or division of a given predetermined number by a simple predetermined factor with the aid of electric switches whose number and arrangement are determined as a function of the said multiplication or division factor.

The apparatus according to the present invention comprises at least as many groups of switches as the number to be multiplied or divided may comprise digits, and each such group is allocated to a separate order, viz. units, tens, etc., in that number. The switches of each group are controlled by a single organ which serves to define or set up the value of the digit in the correspondin order of the multiplicand or dividend. The switches are ten-position switches when the apparatus is to be used for operation with decimal numbers; they possess $n$ positions when used with a number system of the base $n$. Each group of switches includes what may be called a principal switch for setting and if desired for effecting display of one of the constituent digits of the number to be multiplied or divided. Each group further includes one or more auxiliary switches coupled to the principal switch in such a way as to define or display a terminal or number corresponding to the desired multiple or submultiple of the digit identified or defined by the said principal switch.

In an operation of multiplication or division by a simple factor, the digits of the product or quotient number resulting from multiplication or division of the multiplicand or dividend by the said factor are the resultant of the addition of the last digit of the operation effected by the factor on the digit of same arithmetic order in the number to be multiplied or divided and of the carry resulting from the operation effected on the digit of adjacent order. To give an example:

$$974\times 3=2922$$

which may be written thus:

```
 974
  ×3
  12
 21
27
2922
```

Consequently in each group each auxiliary switch is connected to one or more auxiliary switches of the adjacent higher or lower order, according as the operation being performed is one of multiplication or division, in order to effect transfer of the carry.

The switches may for example take the form of rotary switches whose central terminals are put into electrical contact with peripheral terminals by means of rotating indices or wiper arms. The indices in a single group are mounted on a common axis controlled by any suitable means such as a handle so that all indices will possess the same rotational position.

The apparatus according to the invention may be constructed to operate either by means of electric current (alternating or direct), the switches effectuating within each group and from group to group the necessary electrical connections, or by means of pulses. When pulses are employed, the switches are used not to display the digits resulting from the operation effected by the factor but to direct toward pulse totalizators, via as many channels as there are digits in the multiplicand number, a number of electric pulses equal to the value of each one of those digits.

The invention will now be further described with reference to the accompanying drawings in which.

Figure 1:
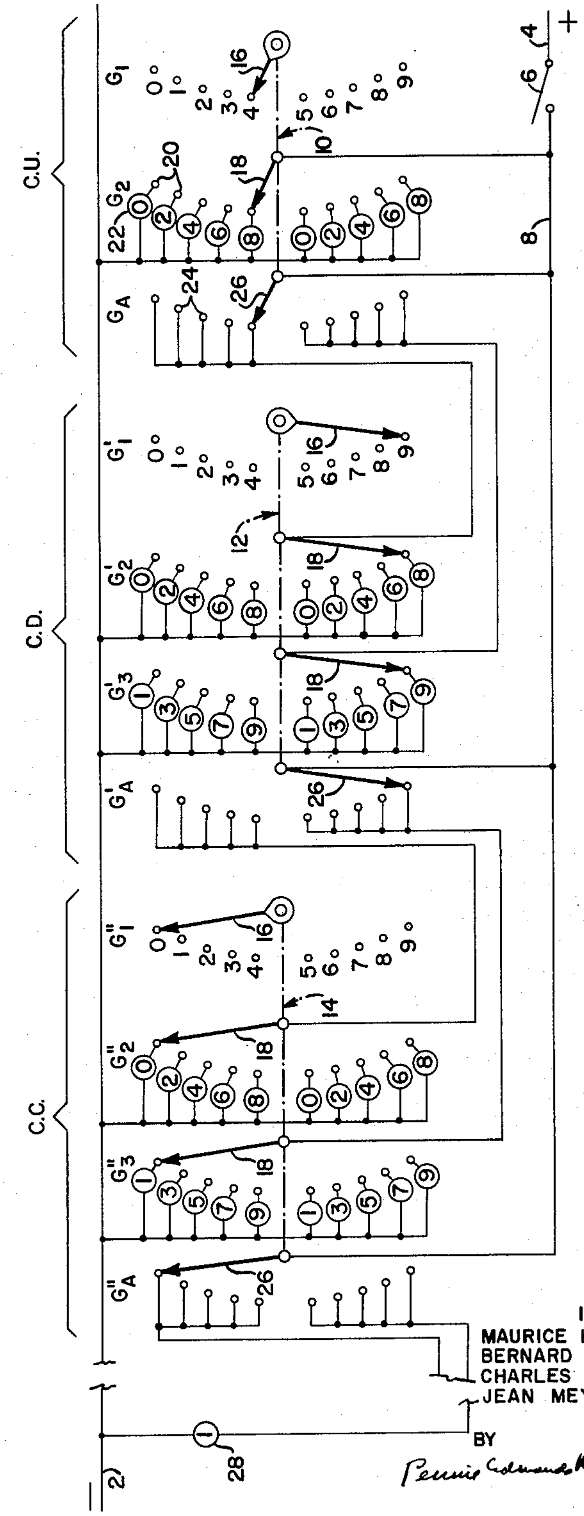
FIGURE 1 is a schematic representation of apparatus according to the invention for multiplying by the factor two.

For simplification in the drawings the principal switches are not shown coupled to any means for display of the multiplicand number digits which they define. Their function is solely a function of indication and not of switching. They will nonetheless hereinafter be described as "principal switches" because they may be used as electric switches, e.g., for a display or monitoring function, without departure from the invention.

FIGURE 1 shows a device for effecting multiplication by two. This apparatus includes one set of switches per arithmetic order. Thus for example there is a switch group C.U. for units, a group C.D. for decades or tens and a group C.C. for hundreds. Each group comprises a principal switch, shown at $G_1$ for the units C.U., at $G'_1$ for the tens C.D, and at $G''_1$ for the hundreds C.C. Each group further comprises one or more auxiliary switches such as those indicated at $G_2$, $G'_2$, $G'_3$, $G''_2$, $G''_3$, etc. Each group further includes an interconnection switch as indicated at $G_A$, $G'_A$, and $G''_A$.

The various digits which make up the number to be multiplied by two, i.e., the digits of the multiplicand, are set up in the example illustrated in FIGURE 1 by manipulation of the principal switch $G_1$ for the units, $G'_1$ for the tens, $G''_1$ for the hundreds and so on.

The different principal switches $G_1$, $G'_1$, $G''_1$, etc. hence include positions for the values zero, one, two, three, four, five, six, seven, eight, nine. These are the numbers whose multiplication by 2 gives the following results:

$0\times 2=0$
$1\times 2=2$
$2\times 2=4$
$3\times 2=6$
$4\times 2=8$
$5\times 2=10$ OR $10+0$
$6\times 2=12$ OR $10+2$
$7\times 2=14$ OR $10+4$
$8\times 2=16$ OR $10+6$
$9\times 2=18$ OR $10+8$ Consequently the switches $G_1$ and $G_2$ of a single group are associated in the following manner;

To the position 0 of $G_1$ there corresponds the display 0 at $G_2$

To the position 1 of $G_1$ there corresponds the display 2 at $G_2$

To the position 2 of $G_1$ there corresponds the display 4 at $G_2$
To the position 3 of $G_1$ there corresponds the display 6 at $G_2$
To the position 4 of $G_1$ there corresponds the display 8 at $G_2$
To the position 5 of $G_1$ there corresponds the display 0 at $G_2$
To the position 6 of $G_1$ there corresponds the display 2 at $G_2$
To the position 7 of $G_1$ there corresponds the display 4 at $G_2$
To the position 8 of $G_1$ there corresponds the display 6 at $G_2$
To the position 9 of $G_1$ there corresponds the display 8 at $G_2$ The remainder or carry 10 occurring upon multiplication by two at each of the last five positions of the principal switch $G_1$ is transmitted to the group of switches of the adjacent higher order in such a fashion that to the number defined by the principal switch $G'_1$ of the said group of adjacent higher order there corresponds the number defined by the associated auxiliary switch $G'_2$, increased by 1, this number appearing at $G'_3$.

To this end the switches $G_1$ and $G_3$ of a single group (above that of lowest order) are associated in the following manner:

To the position 0 of $G_1$ there corresponds the display of 1 at $G_3$ (i.e., value of $G_2+1$)
To the position 1 of $G_1$ there corresponds the display of 3 at $G_3$ (i.e., value of $G_2+1$)
To the position 2 of $G_1$ there corresponds the display of 5 at $G_3$ (i.e., value of $G_2+1$)
To the position 3 of $G_1$ there corresponds the display of 7 at $G_3$ (i.e., value of $G_2+1$)
To the position 4 of $G_1$ there corresponds the display of 9 at $G_3$ (i.e., value of $G_2+1$)
To the position 5 of $G_1$ there corresponds the display of 1 at $G_3$ (i.e., value of $G_2+1$)
To the position 6 of $G_1$ there corresponds the display of 3 at $G_3$ (i.e., value of $G_2+1$)
To the position 7 of $G_1$ there corresponds the display of 5 at $G_3$ (i.e., value of $G_2+1$)
To the position 8 of $G_1$ there corresponds the display of 7 at $G_3$ (i.e., value of $G_2+1$)
To the position 9 of $G_1$ there corresponds the display of 9 at $G_3$ (i.e., value of $G_2+1$)

In the foregoing table, $G_2$ is the first auxiliary switch in the order containing the switches $G_1$ and $G_3$ of the table, the primes having been omitted. In the figures, single primes denote the second order and double primes denote the third order.

The auxiliary switches $G'_2$, $G''_2$, are energized only when there is no remainder or carry deriving from the group of switches of the adjacent lower order, a condition that occurs only for the first five numbers, zero, one, two, three, four, of the principal switch in the said adjacent lower order.

In consequence the group of switches C.U. is connected electrically to the auxiliary switch $G'_2$ of C.D. only for the 0, 1, 2, 3, 4 positions of $G_1$, the connection being effected by means of the first five terminals on the auxiliary interconnection switch $G_A$. For the five last positions 5, 6, 7, 8 and 9 of $G_1$, the switch group of the units order C.U. is connected to the switch $G'_3$ of the tens order C.D. by means of the last five terminals on the auxiliary interconnection switch $G_A$, the number displayed by the switch $G'_3$ in C.D. being the same as that displayed by $G_2$ in C.D. increased by the carry one.

The operation of the apparatus is as follows:

If the number to be multiplied by 2 is 094 for example the digit 4 is set up in the units switch group C.U. where it is displayed by means of the principal switch $G_1$. Similarly in the tens and hundreds orders respectively the digit 9 is set up by means of the principal switch $G'_1$, and the digit 0 is set up by means of the principal switch $G''_1$.

The rotating wipers on the switches being mounted on a common axis within each group, the wipers of the switches $G_2$ and $G_A$ in the units order and correspondingly of the switches $G'_2$, $G'_3$ and $G'_A$ in the tens order and $G''_2$, $G''_3$ and $G''_A$ in the hundreds order take positions corresponding to the positions of $G_1$, $G'_1$ and $G''_1$ respectively.

To the fifth position (labeled 4) of $G_1$ in C.U. there corresponds the terminal or display "8" on switch $G_2$ and the fifth terminal on switch $G_A$. The two terminals of the lamp connected to terminal 8 of switch $G_2$ in the units order are therefore connected to two poles of a source of potential difference and this lamp will light, displaying the number 8.

To the tenth position 9 of $G'_1$ in the tens order C.D. there corresponds the terminal or display "8" on $G'_2$, also terminal or display "9" on $G'_3$ and the tenth terminal on $G'_A$. The switch $G'_2$ is energized via the fifth terminal on $G_A$ whereas the switch $G'_3$ is not energized. Hence the lamp connected to terminal "8" on $G'_2$ will be lighted, exhibiting the number "8," whereas the lamp connected to terminal 9 on $G'_3$ will not be lighted.

To the first position 0 and $G''_1$ there correspond the terminals or displays "0" on $G''_2$, "1" on $G'_3$ and, in case there is a group of switches for the thousands order, the first terminal on $G''_A$. If there is not, the first five terminals on $G''_A$ are without connection, the last five being connected to one of the terminals of a lamp for display of the number 1, of which the other terminal connects to one of the poles of the source of current. The auxiliary switch $G''_2$ is not fed by the interconnection switch $G'_A$ since, as shown in FIGURE 1, $G'_A$ is in its tenth position. On the other hand the switch $G''_3$ is energized, hence the lamp connected to the first terminal on $G''_3$ is energized and the digit 1 on $G''_3$ will be displayed.

The result displayed is hence 188, which is double the values of 094.

Referring again to FIGURE 1, the two terminals of a source of potential difference are shown at conductors 2 and 4. Conductor 4 connects, via an on-off switch 6 for the entire apparatus of FIGURE 1, with a conductor 8. The apparatus of FIGURE 1 further includes a plurality of ganged switches of which three are shown generally at 10, 12 and 14. These switches are respectively allocated to the units, tens and hundreds orders of the multi-digit multiplicand numbers which are, in the apparatus of FIGURE 1, to be multiplied by two. For higher order digits of the multiplicand additional switches similar to switch 14 may be provided in FIGURE 1 to the left of switch 14.

Each of switches 10, 12 and 14 includes a plurality of "decks" or individual ten position switches ganged together. One deck, sometimes herein called a "principal switch," and identified at $G_1$, $G'_1$ and $G''_1$ in the switches 10, 12 and 14 respectively, may include simply a pointer 16 movable to ten positions numbered 0 to 9. These positions may be defined by mechanical detent elements 17. If desired, indicator lamps may be provided for the display of the digits thus selected by the pointers 16, the pointers then serving a switching function to energize the indicator lamps at the positions to which the pointers are set. Setting of the pointers may be manually effected.

A second deck in switch 10 is identified at $G_2$ and is sometimes herein called an auxiliary switch. Two similar second decks are provided in each of the switches 12 and 14, identified at $G'_2$, $G'_3$ and at $G''_2$ and $G''_3$. Each of these second decks includes ten stationary terminals 20 and a movable wiper contact 18. The stationary contacts 20 lead through individual lamps 22 to the conductor 2. In switch 10, wiper arm 18 connects to conductor 8.

Each of switches 10, 12 and 14 includes a third deck, sometimes herein called a transfer switch, and identified at $G_A$, $G'_A$ and $G''_A$ in switches 10, 12 and 14 respectively. Each of these third decks includes ten stationary terminals 24 and a movable wiper contact 26. The wiper contacts 26 connect with conductor 8. The first five stationary contacts 24 connect in parallel to the wiper 18 of the first auxiliary switch of adjacent higher order, while the second five stationary contacts 24 connect in parallel to the wiper 18 of the second auxiliary switch of adjacent higher order. Thus the first five terminals 24 of deck $G_A$ in switch 10 connect to wiper 18 of deck $G'_2$ while the last five terminals 24 of deck $G_A$ connect to wiper 18 of deck $G'_3$. The first five and last five terminals of deck $G'_A$ in switch 12 similarly connect respectively to the wipers 18 of decks $G''_2$ and $G''_3$ in switch 14.

The indicator lamps 22 have painted thereon or otherwise associated therewith indicia as indicated by the numbers shown, in FIGURE 1, within the circles which represent these indicator lamps. In decks $G_2$, $G'_2$ and $G''_2$ of switches 10, 12 and 14 these indicia are the lowest order digits of the numbers (whether one-digit or two-digit) which equal respectively the products of the numbers 0 to 9 multiplied by two. In decks $G'_3$ and $G''_3$ of switches 12 and 14, these indicia are, at corresponding terminals 22, the same as the indicia in decks $G'_2$ and $G''_2$, increased by unity.

In each of switches 10, 12 and 14, the pointer 16 and all wipers 18 and 26 are fixed relative to each other and occupy the same angular position. Thus, for determination of the product of any three-digit number and two, it is only necessary to set up the digits of that number on the switches 10, 12 and 14 beginning at switch 10 with the digit of lowest order, and the product may be read off from the illuminated lamps in the decks $G''_3$ or $G''_2$, $G'_3$ or $G'_2$, and $G_2$. Since the product will, for multiplicands of value above 499, include a digit in the fourth order, provision must be made for display of this fourth order product digit. If only three ganged switches 10, 12 and 14 are provided, this fourth order digit can have only the value unity, and display thereof is provided for by connecting the last five terminals 24 on deck $G''_A$ to one side of a lamp 28, the other side of which leads to conductor 2. This lamp may be arranged to display the number one. The first five terminals 24 of $G''_A$ may be suppressed in such an embodiment.

It is evident that the apparatus schematically shown in FIGURE 1 may be extended to any number of digits.

Figure 2:
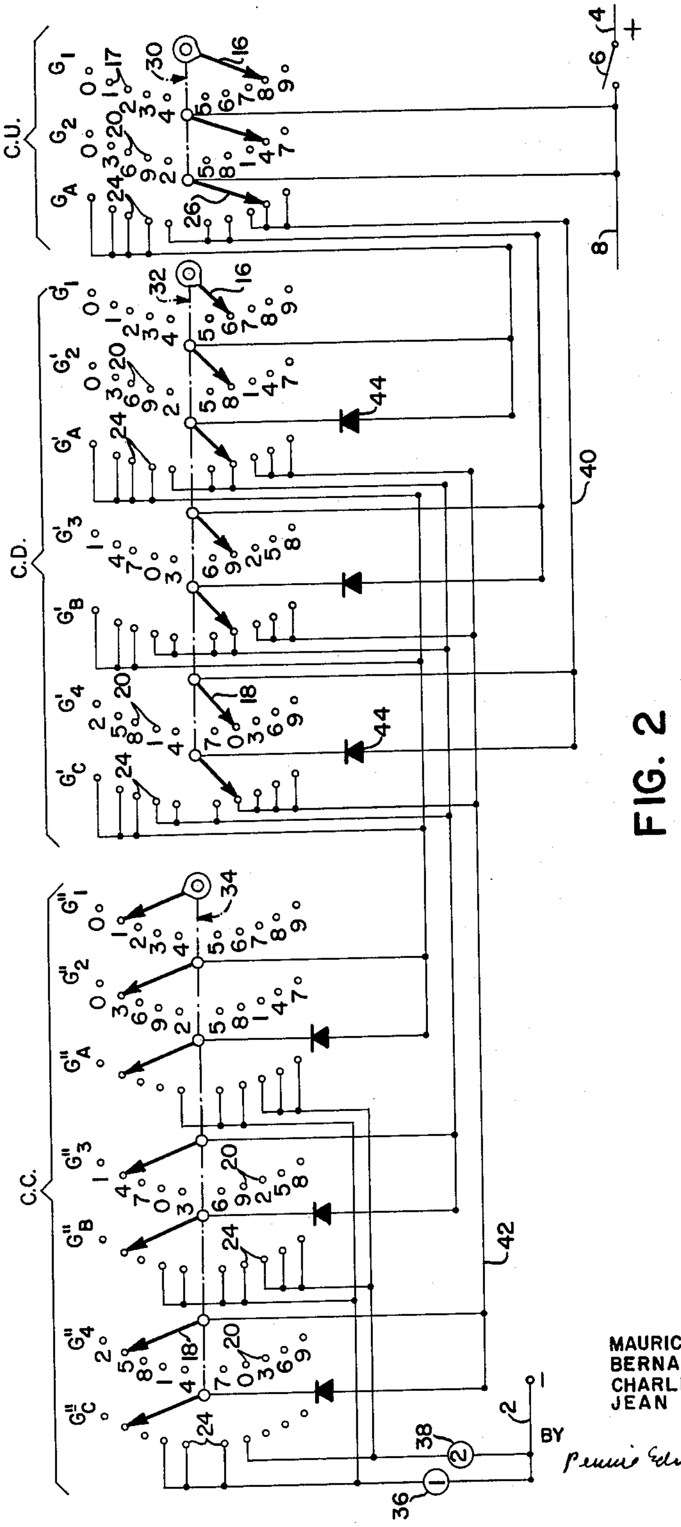
FIGURE 2 is a schematic representation of apparatus according to the invention for multiplying by three.

The apparatus represented schematically in FIGURE 2 is so constructed as to effect multiplication by three. It is analogous to that shown in FIGURE 1, differing only in that it requires a larger number of auxiliary switches since the carries to be taken care of are either on or two.

In the same fashion as in FIGURE 1 and for simplication of the figure the principal switches possess in FIGURE 2 no electrical function. Rather they are provided only for set up and indication of the value of the multiplicand digits. Moreover, and again for purposes of simplification, the lamps connected to the terminals of the auxiliary switches and fed by those terminals for display of the product or answer digits have not been shown. It is to be assumed in the description following that each time a terminal is energized on any of the auxiliary switches $G_2$, $G'_2$, $G''_2$, $G'_3$, $G''_3$, $G'_4$, $G''_4$, the corresponding lamp will be illuminated for display of an answer digit by illumination of an indicium associated with that lamp.

The different principal switches $G_1$, $G'_1$, $G''_1$, possess each ten positions for the multiplicand digit numbers 0, 1, 2, 3, 4, 5, 6, 7, 8, 9, whose multiplication by 3 produces the following products:

$0\times3=0$
$1\times3=3$
$2\times3=6$
$3\times3=9$
$4\times3=12$ OR $10+2$
$5\times3=15$ OR $10+5$
$6\times3=18$ OR $10+8$
$7\times3=21$ OR $20+1$
$8\times3=24$ OR $20+4$
$9\times3=27$ OR $20+7$ Consequently the switches $G_1$ and $G_2$ in each group (ignoring primes) are associated in the following fashion:

To position 0 on $G_1$, the number displayed at $G_2$ will be 0
To position 1 on $G_1$, the number displayed at $G_2$ will be 3
To position 2 on $G_1$, the number displayed at $G_2$ will be 6
To position 3 on $G_1$, the number displayed at $G_2$ will be 9
To position 4 on $G_1$, the number displayed at $G_2$ will be 2
To position 5 on $G_1$, the number displayed at $G_2$ will be 5
To position 6 on $G_1$, the number displayed at $G_2$ will be 8
To position 7 on $G_1$, the number displayed at $G_2$ will be 1
To position 8 on $G_1$, the number displayed at $G_2$ will be 4
To position 9 on $G_1$, the number displayed at $G_2$ will be 7

The remainder 10 deriving from the multiplication by three of the digits 4, 5 and 6 and the remainder 20 deriving from the multiplication by three of the digits 7, 8 and 9 are transmitted to the switch group of adjacent higher order in such fashion that, e.g., in the case of transfers from C.U. to C.D., to the number defined by the principal switch $G'_1$ of the order C.D. there corresponds (i.e., is displayed) the last digit of the number which is three times the value of the number defined by $G'_1$ of that higher order, augmented by 1 when the carry is unity and augmented by 2 when the carry is two.

To this end the switches $G'_1$ and $G'_3$ of the group C.D. are associated in the following manner:

For position 0 of $G'_1$, the number displayed at $G'_3$ is 1 (value displayable at $G'_2$ plus 1)
For position 1 of $G'_1$, the number displayed at $G'_3$ is 4 (value displayable at $G'_2$ plus 1)
For position 2 of $G'_1$, the number displayed at $G'_3$ is 7 (value displayable at $G'_2$ plus 1)
For position 3 of $G'_1$, the number displayed at $G'_3$ is 0 (value displayable at $G'_2$ plus 1)
For position 4 of $G'_1$, the number displayed at $G'_3$ is 3 (value displayable at $G'_2$ plus 1)
For position 5 of $G'_1$, the number displayed at $G'_3$ is 6 (value displayable at $G'_2$ plus 1)
For position 6 of $G'_1$, the number displayed at $G'_3$ is 9 (value displayable at $G'_2$ plus 1)
For position 7 of $G'_1$, the number displayed at $G'_3$ is 2 (value displayable at $G'_2$ plus 1)
For position 8 of $G'_1$, the number displayed at $G'_3$ is 5 (value displayable at $G'_2$ plus 1)
For position 9 of $G'_1$, the number displayed at $G'_3$ is 8 (value displayable at $G'_2$ plus 1)

In the hundreds order of FIGURE 2, the displays at the switch $G''_3$ are related in identical fashion to the positions of $G''_1$.

In the tens order C.D. of FIGURE 3, the switches $G'_1$ and $G'_4$ are associated in the following fashion:

For position 0 of $G'_1$, the number displayed at $G'_4$ is 2 (value displayable at $G'_2$ plus 2)
For position 1 of $G'_1$, the number displayed at $G'_4$ is 5 (value displayable at $G'_2$ plus 2)
For position 2 of $G'_1$, the number displayed at $G'_4$ is 8 (value displayable at $G'_2$ plus 2)
For position 3 of $G'_1$, the number displayed ot $G'_4$ is 1 (value displayable at $G'_2$ plus 2)
For position 4 of $G'_1$, the number displayed at $G'_4$ is 4 (value displayable at $G'_2$ plus 2)

For position 5 of $G'_1$, the number displayed at $G'_4$ is 7 (value displayable at $G'_2$ plus 2)
For position 6 of $G'_1$, the number displayed at $G'_4$ is 0 (value displayable at $G'_2$ plus 2)
For position 7 of $G'_1$, the number displayed at $G'_4$ is 3 (value displayable at $G'_2$ plus 2)
For position 8 of $G'_1$, the number displayed at $G'_4$ is 6 (value displayable at $G'_2$ plus 2)
For position 9 of $G'_1$, the number displayed at $G'_4$ is 9 (value displayable at $G'_2$ plus 2)

In the hundreds order C.C. of FIGURE 2 the displays at the switch $G''_4$ are related in identical fashion to the position of $G''_1$.

The auxiliary switches $G'_2$, $G''_2$, etc. are energized only when there is no carry from the switch group of arithmetically preceding order. This occurs only for the positions 0, 1, 2 and 3 of the principal switch of that group of preceding order. Consequently the switch group of the units order C.U. is electrically connected to the auxiliary switch $G'_2$ of the tens order C.D. only for the positions 0, 1, 2 and 3 of $G_1$ by means of the first four terminals on the auxiliary interconnection switch $G_A$ in the units order C.U.

The auxiliary switches $G'_3$ and $G''_3$, etc., are energized only when there is a carry or remainder of unity deriving from the switch group of the preceding or lower order, which occurs only for the 4, 5 and 6 positions of the principal switch of that group. Consequently the group of switches C.U. is electrically connected to the switch $G'_3$ of the decades order C.D. only for the 4, 5 and 6 positions of $G_1$ by means of the fifth, sixth and seventh terminals on switch $G_A$.

The switches $G'_4$, $G''_4$ are provided for cases in which the carry from the adjacent lower order is two. The units group is connected to $G'_4$ of the tens group C.D. only for the 7, 8 and 9 positions of $G_1$ by means of the three last terminals on $G_A$.

It is evident that in the example given in FIGURE 2 there are no switches $G_3$ and $G_4$ in the group C.U. in view of the fact that there does not exist any switch or switches of order below the units order C.U.

The apparatus shown in FIGURE 1 includes only a single interconnection switch $G_A$, $G'_A$ and $G''_A$ per order of switches, whereas the apparatus shown in FIGURE 2 is provided with one interconnection switch for each auxiliary switch. This comes from the fact that the carries 0, 1 or 2 must be shiftable from one auxiliary switch to another within each group of switches.

Provision for such shift is made necessary by the fact that a carry from a lower order can give rise in its turn to a carry which, absent the carry from the lower order, would not take place. For example to the fourth position 3 of the principal switch $G'_1$ there may correspond for display as an answer digit either the value 9 at $G'_2$ (if there is no carry from the units order) or the value 0 at $G'_3$, if there is a carry of one from C.U. Again, setting of $G'_1$ in C.D. to its fourth position of value 3, may call for display of 1 at $G'_4$ (1 here being the last digit of 11) if the carry from the C.U. is 2.

Similarly, setting of $G'_1$ to its seventh position of value 6, may call for display of 8 at $G'_2$ (no carry from C.U.), of 9 at $G'_3$ (last digit of partial product 18 plus carry of 1 from C.U.) or of 0 at $G'_4$ (last digit of 18 plus carry of 2 from C.U.). If it calls for display of 8 or of 9 there will be a carry of 1 to take forward to C.C. If it calls for display of 0, there will be a carry of two to take forward to C.C.

The carries to be transmitted to the adjacent higher order group being unlike among the various auxiliary switches, it is necessary to provide a separate interconnection switch for each auxiliary switch. Thus for the auxiliary switch $G'_2$ there is provided interconnection switch $G'_A$. $G'_A$ connects $G'_2$ to $G''_2$ for the 0, 1, 2 and 3 positions of the principal switch $G'_1$, to $G''_3$ for the positions 4, 5 and 6 of $G'_1$, and to $G''_4$ for the positions 7, 8 and 9 of $G'_1$. For the auxiliary switch $G'_3$ there is provided the interconnection switch $G'_B$ which connects $G'_3$ to $G''_2$ for the positions 0, 1 and 2 of $G'_1$. $G'_B$ also connects $G'_3$ to $G''_3$ for the $G'_1$ positions 3, 4, 5 and 6 and to $G''_4$ for the $G'_1$ positions 7, 8 and 9. For the auxiliary switch $G'_4$ there is provided the interconnection switch $G'_C$ which connects $G'_4$ and $G''_2$ for the $G'_1$ positions 0, 1 and 2 to $G''_3$ for the $G'_1$ positions 3, 4 and 5 and to $G''_4$ for the $G'_1$ positions 6, 7, 8 and 9.

When there is a group of switches for the thousands orders C.M. higher than the hundreds order C.C., the auxiliary switches are connected in identical fashion to interconnection switches $G''_A$, $G''_B$ and $G''_C$.

Preferably, diodes as indicated at 44 are inserted into the conductors which energize the wipers of the interconnection switches of higher order from those of lower order so that such energization can occur only in the sense leading from lower to higher orders.

Referring against to FIGURE 2, the ganged switches of first, second and third order are identified generally at 30, 32 and 34. Each includes, as in FIGURE 1, a ten position pointer 16, and at least one combination of a ten position "auxiliary" switch for display of a product digit and a ten position "interconnection" switch for the selection, in the ganged switch of next higher order, of display switches correctly reflecting the carry required to be taken from the lower order into that next higher order. As in FIGURE 1, the pointer and all wiper arms in each ganged switch are fixed relative to each other.

In the first order C.U. of FIGURE 2 there is one such combination, including "auxiliary switch" deck $G_2$ for illumination of product digit display lamps (not shown) and "transfer switch" deck $G_A$ for selection in the tens order ganged switch 32 of an auxiliary switch deck correctly reflecting the carry required to be made into the second order.

In the ganged switch 32 of second order C.D. of FIGURE 2, there are three such combinations, $G'_2$ and $G'_A$ for zero carry from the units order C.U., $G'_3$ and $G'_B$ for unity carry from C.U., and $G'_4$ and $G'_C$ for two carry from C.U.

Similarly in FIGURE 2 the third or hundreds order C.C. includes three such combinations $G''_2$, $G''_A$; $G''_3$, $G''_B$; and $G''_4$, $G''_C$ for zero, unity and two carries respectively from the tens order C.D.

The "auxiliary switch" decks $G_2$, $G'_2$, $G'_3$, $G'_4$, $G''_2$, $G''_3$, $G''_4$ are all ten position switches, controlling in each position the illumination of a product digit display lamp (not shown in FIGURE 2) similar to the lamps 22 of FIGURE 1. The indica associated with those display lamps are however indicated in FIGURE 2, adjacent the switch terminals 20. These indicia are in every case those of the cardinal numbers 0 to 9 which represent the last digit of the sum of the product which is given by three times the value of the position of the pointer 16, plus the carry required to be taken from the previous order by reason of the position of the pointer 16 in such previous order.

In FIGURE 2 for $G_2$, $G'_2$ and $G''_2$ these indicia numbers are 0, 3, 6, 9, 2, 5, 8, 1, 4, 7, these being the last digits of the numbers which are three times the numbers 0, 1, 2, 3, 4, 5, 6, 7, 8, 9. For $G'_3$ and $G''_3$ in FIGURE 2, the associated indicia numbers 1, 4, 7, 0, 3, 6, 9, 2, 5, 8 are the last digits just referred to increased by a carry of unity. For $G'_4$ and $G''_4$ they are 2, 5, 8, 1, 4, 7, 0, 3, 6, 9, being the last digits just referred to increased by a carry of two.

The "transfer or interconnection switch" decks $G_A$, $G'_A$, $G'_B$, $G'_C$, $G''_A$, $G''_B$ and $G''_C$ have their terminals 24 divided into groups according to the value 0, 1 or 2 of the second digit of the sum described in the next preceding paragraph hereof, and each of these groups is connected in parallel to the wiper of a separate "auxiliary switch" deck in the next higher order.

For display of the fourth order digit in the final product, which may have a value 0, 1 or 2, two indicia display lamps 36 and 38 are provided. The first, displaying when lighted the indicium 1, is connected between conductor 2 and the 5th, 6th and 7th terminals 24 of $G''_A$, the 4th through 7th terminals 24 of $G''_B$, and the 4th through 6th terminals 24 of $G''_C$. The terminals 24 are here identified by their ordinal positions counting counterclockwise from the top in FIG. 2, it being noted that the first terminal 24 on each of $G''_A$, $G''_B$ and $G''_C$ is engaged by its wiper 26 when pointer 16 of switch 34 is in its *zero* position, and so on. The second lamp, identified at reference character 38, displays when lighted the indicium 2 and is connected between conductor 2 and the 8th through 10th terminals 24 on each of $G''_A$ and $G''_B$ and between conductor 2 and the 7th through 10th terminals 24 on $G''_C$. In the absence of a ganged switch for the fourth order, the first three terminals of $G''_C$ are left open.

FIG. 2 illustrates derivation of the product 504 of the number 168 multiplied by 3. The lowest order digit 4 of the answer is displayed at the lamp (not shown) which is in series with the ninth contact 20 of $G_2$ in C.U. The second lowest order digit 0 of the answer is displayed at the lamp (not shown) which is in series with the seventh terminal 20 of $G'_4$ in C.D., the wiper 18 of $G'_4$ being energized from the wiper 26 of $G_A$ via a conductor 40 and a diode 44. The third digit 5 of the answer is displayed at the lamp (not shown) which is in series with the second terminal 20 of $G''_4$, the wiper 18 of $G''_4$ being energized from $G'_C$ via a conductor 42.

Figure 3:
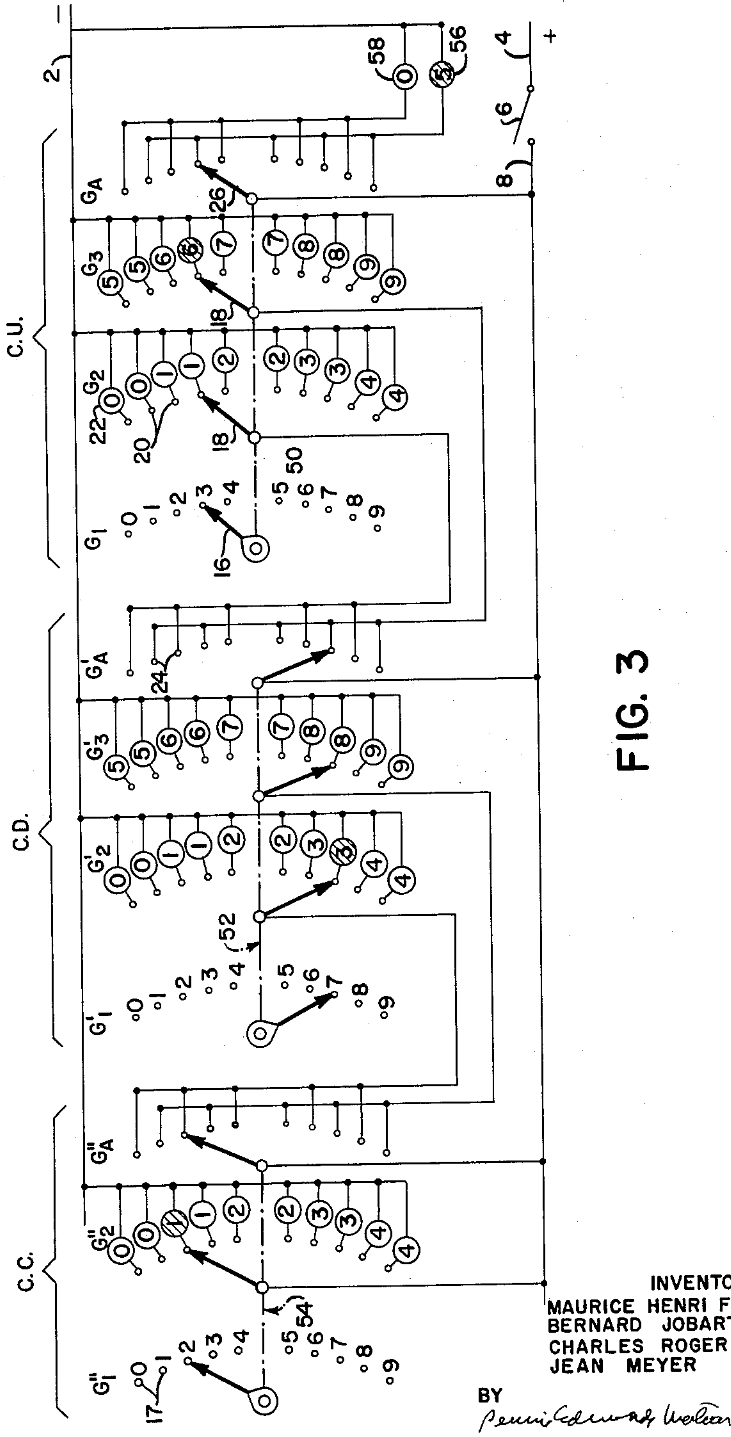
FIGURE 3 is a schematic representation of apparatus according to the invention for effecting division by two.

The apparatus schematically shown in FIGURE 3 has been constructed in such a way as to effectuate division of an arbitrary number by two, that is to say it effects the operation inverse to that effected by the apparatus shown in FIGURE 1.

In consequence, the apparatus in FIGURE 3 is so constructed as to be analogous to that for multiplication already described, the connections being reversed. Thus the transfer of carries is effected from a group of higher order to a group of adjacent lower order, whereas in FIGURE 1 it is effected from a group of lower order to the adjacent group of higher order.

Three ganged switches 50, 52 and 54 are provided, essentially similar to the two ganged switches of FIGURES 1 and 2. Each includes a principal switch or switch deck for set up of a dividend digit, at least one auxiliary switch or switch deck for display of a quotient digit, and an interconnection switch or switch deck for the transfer of remainders to the next lower order.

The different numbers making up the dividend or number to be divided by two are set up and indicated by means of principal switches $G_1$, $G'_1$, $G''_1$. These switches may be identical to the switches $G_1$, $G'_1$ and $G''_1$ of FIGURE 1.

The different switches $G_1$, $G'_1$ and $G''_1$ include therefore ten positions representative of the digits, 0 to 9, whose division by two gives the following quotients:

| | | |
|---|---|---|
| 0:2=0 | OR | 0 |
| 1:2=½ | OR | 0+(1:2) |
| 2:2=1 | OR | 1 |
| 3:2=1½ | OR | 1+(1:2) |
| 4:2=2 | OR | 2 |
| 5:2=2½ | OR | 2+(1:2) |
| 6:2=3 | OR | 3 |
| 7:2=3½ | OR | 3+(1:2) |
| 8:2=4 | OR | 4 |
| 9:2=4½ | OR | 4+(1:2) |

Consequently the switches $G_1$ and $G_2$ and the display lamps of a given group (ignoring primes, which merely identify the order) are associated in the following fashion:

Position 0 of $G_1$ requires display of 0 at $G_2$
Position 1 of $G_1$ requires display of 0 at $G_2$
Position 2 of $G_1$ requires display of 1 at $G_2$
Position 3 of $G_1$ requires display of 1 at $G_2$
Position 4 of $G_1$ requires display of 2 at $G_2$
Position 5 of $G_1$ requires display of 2 at $G_2$
Position 6 of $G_1$ requires display of 3 at $G_2$
Position 7 of $G_1$ requires display of 3 at $G_2$
Position 8 of $G_1$ requires display of 4 at $G_2$
Position 9 of $G_1$ requires display of 4 at $G_2$ The complementary operations not effected, such as for example the remainder 1:2 (in the embodiment of FIGURE 3) are transmitted in the form of remainders such as 10:2 to the switch group of adjacent lower order in such a way that, for the number set upon the principal switch of the said lower order group there will be displayed, via the lamps associated with an auxiliary switch of that adjacent lower order, the number which equals one half the number so set up in that lower order (ignoring a remainder of ½ if present), augmented by five.

To this end the switches $G_1$ and $G_3$ and the lamps 22 of $G_3$ in each group (again ignoring primes) are associated in the following fashion:

0 at $G_1$, requires display of 5 at $G_3$, i.e., whole number portion of 0:2+10:2=5
1 at $G_1$, requires display of 5 at $G_3$, i.e., whole number portion of 1:2+10:2=5+1:2
2 at $G_1$, requires display of 6 at $G_3$, i.e., whole number portion of 2:2+10:2=6
3 at $G_1$, requires display of 6 at $G_3$, i.e., whole number portion of 3:2+10:2=6+1:2
4 at $G_1$, requires display of 7 at $G_3$, i.e., whole number portion of 4:2+10:2=7
5 at $G_1$, requires display of 7 at $G_3$, i.e., whole number portion of 5:2+10:2=7+1:2
6 at $G_1$, requires display of 8 at $G_3$, i.e., whole number portion of 6:2+10:2=8
7 at $G_1$, requires display of 8 at $G_3$, i.e., whole number portion of 7:2+10:2=8+1:2
8 at $G_1$, requires display of 9 at $G_3$, i.e., whole number portion of 8:2+10:2=9
9 at $G_1$, requires display of 9 at $G_3$, i.e., whole number portion of 9:2+10:2=9+1:2

The complementary operation 1:2 still not performed is transmitted in the form of the remainder 10:2 to the group of switches of next lower order in the same manner as just described.

The auxiliary switches $G_2$, $G'_2$, $G''_2$ are energized only when there is no remainder coming from the switch group of arithmetically preceding order, that is, in a case of division, from the adjacent higher order. This occurs only when the number set up at the principal switch in that higher order is a multiple of two.

Consequently the auxiliary switch $G_2$ in the units order C.U. is electrically connected, at its movable index on wiper 18, to the switch group C.D. in the tens order for the positions 0, 2, 4, 6 and 8 of $G'_1$ in C.D., by means of five terminals 24 at the corresponding even positions on $G'_A$. The auxiliary switch $G_3$ in the units order C.U. is electrically connected at its wiper 18 to the switch group of the tens order C.D. for the positions 1, 3, 5, 7 and 9 of $G'_1$ by means of the five odd terminals 24 on switch $G'_A$. The numbers displayed via the lamps 22 of switch $G_3$ are in both C.U. and C.D. the same as those displayable at $G_2$, augmented by the remainder to be carried, i.e., 5.

The operation of the apparatus is as follows: If the number to be divided by two is 273 for example, the digit 3 will be set up at principal units order switch $G_1$, the digit 7 at the principal tens order switch $G'_1$, and the digit 2 at the principal hundreds order switch $G''_1$.

The rotating indices on the switches being within each group fixed to a common shaft, the indices of the switches $G_2$, $G_3$ and $G_A$; $G'_2$, $G'_3$, and $G'_A$; $G''_2$, $G''_3$ and $G''_A$, take up positions corresponding to the indices of $G_1$, $G'_1$ and $G''_1$. This state of affairs is illustrated in FIGURE 3.

To the third position 2 on $G''_1$ there corresponds the third terminal on each of $G''_2$ and $G''_A$ as hereinabove explained. That is to say, when the index or pointer on $G''_1$ is on the third terminal of $G''_1$ associated with the digit 2, the index of $G''_2$ is on the third terminal of $G''_2$, this third terminal being connected to a lamp arranged to display the digit 1. The index of $G''_A$ is on the third terminal of $G''_A$ which is electrically connected to the wiper of the switch $G'_2$ of adjacent lower order. The two terminals of the lamp connected to the third terminal of $G''_2$ being connected to the two terminals 2 and 6 of the source of voltage, this lamp is illuminated, displaying the digit 1, which is the highest order digit of the desired quotient 273/2.

To the eighth positon of value 7 on $G'_1$ there corresponds display of 3 via $G'_2$ and of 8 via $G'_3$ as hereinabove described, and also energization of the eighth terminal on $G'_A$. That is, the index of $G'_1$ being on eighth terminal of $G'_1$ which is associated with the dividend digit 7, the index of $G'_2$ will be on the eighth terminal of $G'_2$. This eighth terminal on $G'_2$ is connected to a lamp arranged to display the digit 3. Further, the index of $G'_3$ is on the eighth terminal of $G'_3$, this eighth terminal being connected to a lamp for display of the digit 8. The wiper index of $G'_2$ is energized, in the case assumed, from the third stationary contact of $G''_A$, whereas the wiper index of $G'_3$ is not energized. Hence the lamp for display of 3 connected to the eighth terminal of $G'_2$ will be lighted but no lamp associated with $G'_3$ will be lighted. Further, the index of $G'_A$ is on the eighth terminal of $G'_A$ which is connected electrically to the switch $G_3$ of the adjacent order C.U. The wiper of $G_3$ in the adjacent lower units order C.U. is therefore energized. The consequence of the foregoing is that 3, the second digit of the desired quotient 273/2, is displayed by means of a lamp in series with the eighth stationary terminal of switch $G'_2$ in the order C.D.

To the fourth position 3 of switch $G_1$ there corresponds, via the fourth terminal of $G_2$, display of the digit 1, similarly display of the digit 6 via $G_3$, and energization of the fourth terminal of $G_A$. That is to say that the index of $G_1$ being on the fourth terminal of $G_1$ (associated with dividend digit 3), the index of $G_2$ is on the fourth terminal of $G_2$ which fourth terminal is connected to a lamp for display of digit one. Moreover the index of $G_3$ is on the fourth terminal of $G_3$, which fourth terminal is connected to a lamp for display of the digit 6. The index of $G_A$ is on the fourth terminal of $G_A$ which is electrically connected to a lamp 56 for display of the digit 5.

The auxiliary switch $G_2$ being not energized via the interconnecting switch $G'_A$, the lamp 22 connected to the fourth terminal of $G_2$ cannot be lighted.

The auxiliary switch $G_3$ being fed via eighth terminal of $G'_A$, the terminals of the lamp 22 connected to the fourth terminal $G_3$ are connected to the voltage source and this lamp will be lighted, displaying the digit 6. This is the third digit in the desired quotient 273/2.

The lamp 56 provided for display of the digit 5 after the decimal point being connected to the terminals of the source of voltage on the one hand directly and on the other hand through the fourth terminal of the interconnection switch $G'_A$, this lamp will be lighted, displaying the digit 5.

The result displayed is hence 136.5 which is one half of 273.

Figure 4:
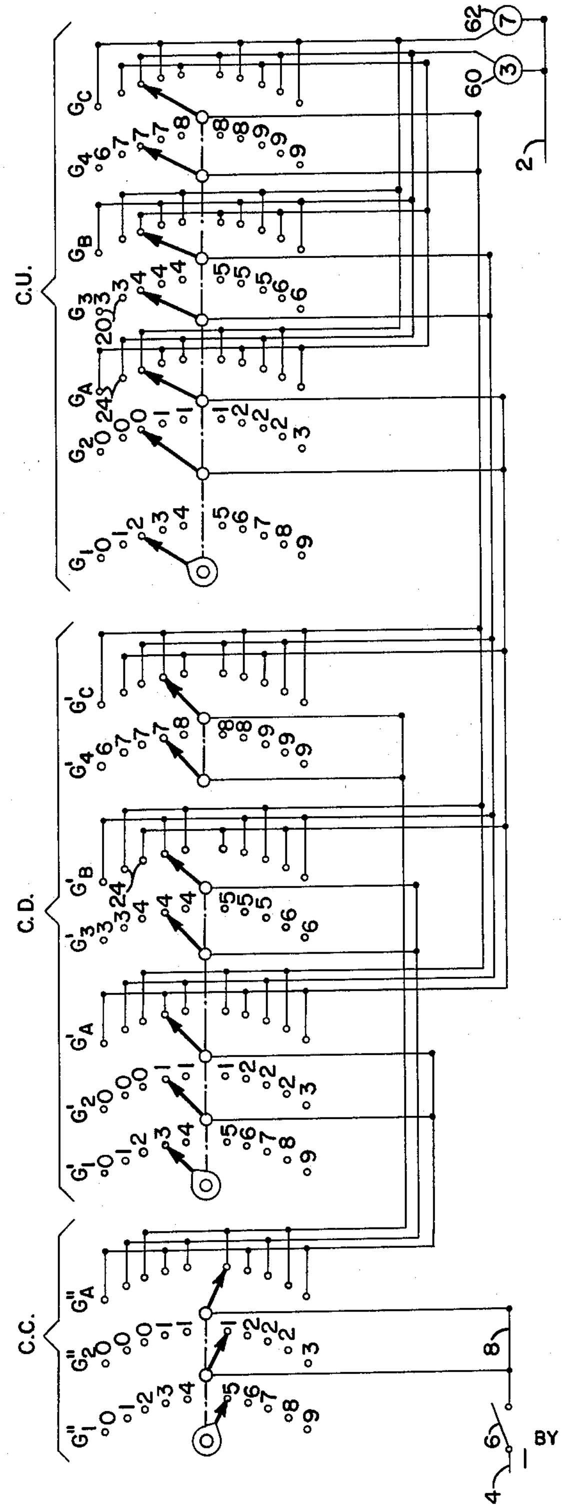
FIGURE 4 is a schematic diagram of apparatus according to the invention for dividing by three.

The apparatus schematically shown in FIGURE 4 is analogous to that just described, set up however to effect division by 3.

As in the case of FIGURE 2 the lamps connected to the terminals of the auxiliary switches and fed by the latter for display of suitable digits have not been shown for reasons of simplicity of the drawing. It will hence be supposed in the following description that each time such a terminal is energized, the corresponding lamp will be lighted.

The three digits making up the number to be divided by 3 are defined and displayed by means of principal switches $G_1$, $G'_1$ and $G''_1$ of FIGURE 4, these switches being identical to those having the same reference characters in FIGURE 2.

These switches thus permit set up of the digits 0 to 9, whose division by three give the following quotients:

| | |
|---|---|
| 0:3=0 | OR 0 |
| 1:3= ⅓ | OR 0+(1:3) |
| 2:3= ⅔ | OR 0+(2:3) |
| 3:3=3 | OR 1 |
| 4:3=1⅓ | OR 1+(1:3) |
| 5:3=1⅔ | OR 1+(2:3) |
| 6:3=2 | OR 2 |
| 7:3=2⅓ | OR 2+(1:3) |
| 8:3=2⅔ | OR 2+(2:3) |
| 9:3=3 | OR 3 |

Consequently the switches $G_1$ and $G_2$ in each group (again ignoring primes) are associated in the following fashion:

To the position of value 0 of $G_1$ there corresponds display of 0 at $G_2$ by means of a lamp 22
To the position of value 1 of $G_1$ there corresponds display of 0 at $G_2$ by means of a lamp 22
To the position of value 2 of $G_1$ there corresponds display of 0 at $G_2$ by means of a lamp 22
To the position of value 3 of $G_1$ there corresponds display of 1 at $G_2$ by means of a lamp 22
To the position of value 4 of $G_1$ there corresponds display of 1 at $G_2$ by means of a lamp 22
To the position of value 5 of $G_1$ there corresponds display of 1 at $G_2$ by means of a lamp 22
To the position of value 6 of $G_1$ there corresponds display of 2 at $G_2$ by means of a lamp 22
To the position of value 7 of $G_1$ there corresponds display of 2 at $G_2$ by means of a lamp 22
To the position of value 8 of $G_1$ there corresponds display of 2 at $G_2$ by means of a lamp 22
To the position of value 9 of $G_1$ there corresponds display of 3 at $G_2$ by means of a lamp 22

The complementary operations 1:3 and 2:3 not yet carried out are transmitted to the switch group of adjacent lower order in the form of the remainders (10:3) or (20:3), according as the division operation being performed requires, in such fashion that for the number set up on the principal switch in the next lower order, there will be displayed, via a lamp associated with an auxiliary switch of that adjacent lower order, the number which equals one third of the number so set up (ignoring remainders of ⅓ or ⅔ if present) augmented by 10/3 or by 20/3 as the case may be.

To this end the switches $G_1$ and $G_3$ in each group are associated in the following fashion:

Setting of $G_1$ to position of value 0 requires at $G_3$ display of 3 derived from 0:3+10:3=3+1:3
Setting of $G_1$ to position of value 1 requires at $G_3$ display of 3 derived from 1:3+10:3=3+2:3
Setting of $G_1$ to position of value 2 requires at $G_3$ display of 4 derived from 2:3+10:3=4
Setting of $G_1$ to position of value 3 requires at $G_3$ display of 4 derived from 3:3+10:3=4+1:3
Setting of $G_1$ to position of value 4 requires at $G_3$ display of 4 derived from 4:3+10:3=4+2:3
Setting of $G_1$ to position of value 5 requires at $G_3$ display of 5 derived from 5:3+10:3=5
Setting of $G_1$ to position of value 6 requires at $G_3$ display of 5 derived from 6:3+10:3=5+1:3

Setting of $G_1$ to position of value 7 requires at $G_3$ display of 5 derived from 7:3+10:3=5+2:3

Setting of $G_1$ to position of value 8 requires at $G_3$ display of 6 derived from 8:3+10:3=6

Setting of $G_1$ to position of value 9 requires at $G_3$ display of 6 derived from 9:3+10:3=6+1:3

The complementary operations 1:3 and 2:3 are transmitted in the forms or remainders 10:3 or 20:3 according to the case to the switches of adjacent lower order in fashion similar already to that described.

Similarly the switches $G_1$ and $G_4$ within each group are associated in the following fashion:

Setting of $G_1$ to position of value 0 requires at $G_4$ display of 6 derived from 0:3+20:3=6+2:3

Setting of $G_1$ to position of value 1 requires at $G_4$ display of 7 derived from 1:3+20:3=7

Setting of $G_1$ to position of value 2 requires at $G_4$ display of 7 derived from 2:3+20:3=7+1:3

Setting of $G_1$ to position of value 3 requires at $G_4$ display of 7 derived from 3:3+20:3=7+2:3

Setting of $G_1$ to position of value 4 requires at $G_4$ display of 8 derived from 4:3+20:3=8

Setting of $G_1$ to position of value 5 requires at $G_4$ display of 8 derived from 5:3+20:3=8+1:3

Setting of $G_1$ to position of value 6 requires at $G_4$ display of 8 derived from 6:3+20:3=8+2:3

Setting of $G_1$ to position of value 7 requires at $G_4$ display of 9 derived from 7:3+20:3=9

Setting of $G_1$ to position of value 8 requires at $G_4$ display of 9 derived from 8:3+20:3=9+1:3

Setting of $G_1$ to position of value 9 requires at $G_4$ display of 9 derived from 9:3+20:3=9+2:3

The complementary operations 1:3 and 2:3 are as in the preceding case transmitted to the switch of adjacent lower order in the form of remainders 10:3 or 20:3 according to circumstance.

Switches $G_2$, $G'_2$ and $G''_2$ are not energized except in the case when the operation being effectuated in the adjacent higher order does not result in a remainder. The switches $G_3$, $G'_3$ and $G''_3$ are not energized except when that operation includes a remainder of ⅓ and hence entails a complementary operation 1:3, carried over in the form 10:3. Moreover the switches $G_4$, $G'_4$ and $G''_4$ are energized only when that operation includes a complementary operation 2:3 carried over under the form 20:3.

The carries to be transmitted from one group of switches to the next being unlike for the various switches $G_2$, $G_3$, $G_4$, in each group (contrary to the situation in case of division by 2), it is necessary as in the case of multiplication by 3 (FIGURE 2) to provide as many interconnection switches $G_A$, $G_B$, $G_C$, etc. as there are auxiliary switches $G_2$, $G_3$, $G_4$.

In FIG. 4, the switches have been set up to perform division by three of the dividend 532, as is apparent from the settings of pointers $G''_1$, $G'_1$ and $G_1$. The answer 177.3 is displayed at the lamps 22 (not shown in FIGURE 4) connected to the 6th terminal 20 of $G''_2$, to the 4th terminal 20 of $G'_4$, to the 3rd terminal 20 of $G_4$, and at a lamp 60 arranged to display the digit 3, which is connected to the third, sixth and ninth terminals 24 of $G_C$. For other dividend numbers whose quotients include a remainder of ⅔ in the units order, there is provided a lamp 62, arranged to display the digit 7. Lamp 62 is connected between voltage source terminal 2 and the first, fourth, seventh and tenth terminals 24 of $G_C$.

Figure 5:
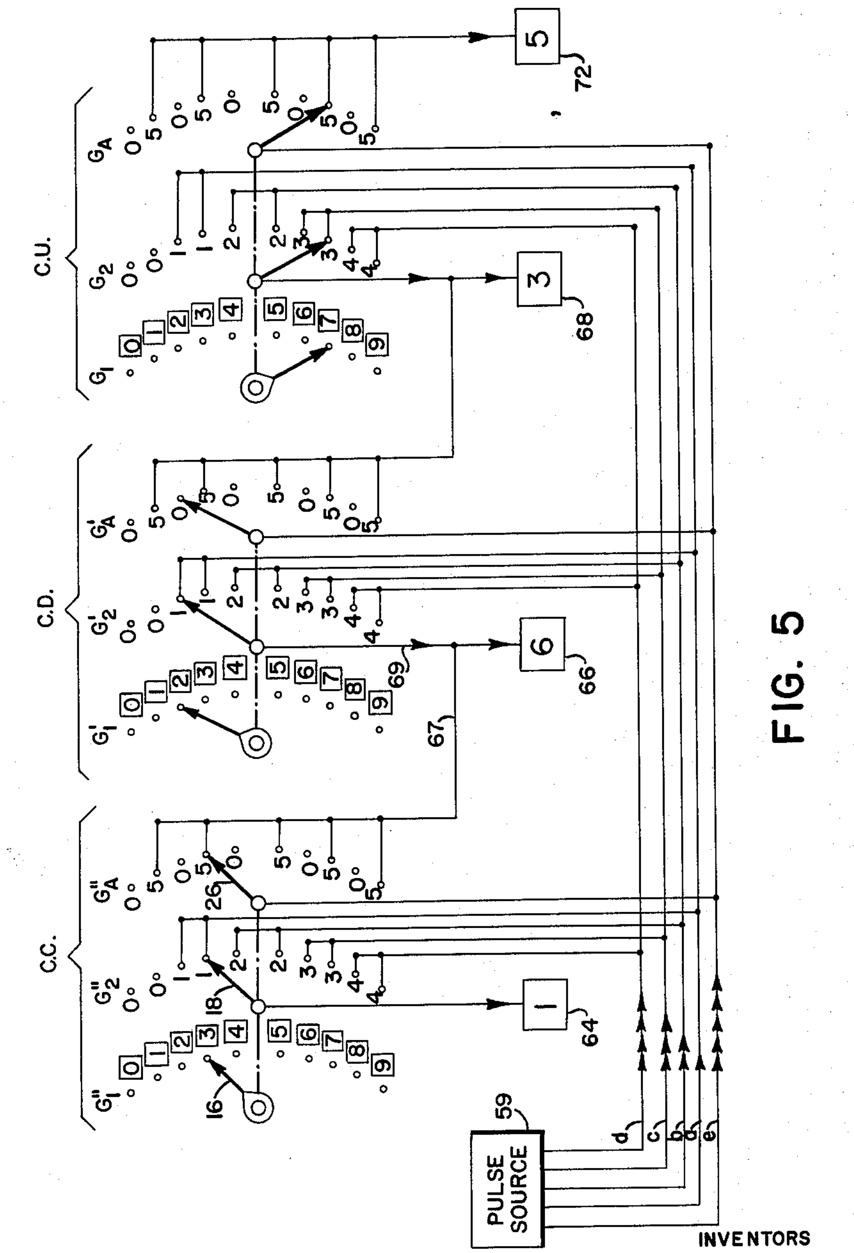
FIGURE 5 represents a modification of the apparatus of FIGURE 3 operating by means of pulses.

The diagram of FIGURE 5 represents a modification of the apparatus shown in FIGURE 3, operating by means of pulses.

In the apparatus of FIGURE 5 the switches are employed not to display the digits of the number representing the result of the operation but to direct toward totalizers, via as many channels as there are digits in that number, numbers of electric pulses equal to the values of those digits.

The different digits making up the number to be divided by 2 are set up and displayed by means of principal switches or pointers $G_1$, $G'_1$, $G''_1$, which may be identical to the pointers $G_1$, $G'_1$ and $G''_1$ hereinabove described.

The switches or pointers $G_1$, $G'_1$, and $G''_1$ are respectively associated with auxiliary switches $G_2$, $G'_2$, $G''_2$, in the same fashion as that described with reference to FIGURE 3, except that the terminals 20 of the switches $G_2$, $G'_2$ and $G''_2$ are not provided for the illumination of lamps for display of the digits of the answer but rather for the delivery to totalizators 64, 66 and 68 of pulses in number equal to the value of the answer digits.

To this end the terminals 20 of $G_2$, $G'_2$ and $G''_2$, for the zero position of the pointers $G_1$, $G'_1$ and $G''_1$, i.e. those corresponding to the digit zero, receive no pulses whatever. The terminals thereof corresponding to the digit one receive one pulse, the terminals corresponding to the terminal two receive two pulses, and so on.

These pulses may be derived from separate sources of pulses.

They may for example be derived from a plurality of pulse transmitters one of which develops only one pulse, the others putting out two pulses, three pulses, four pulses and so on. Alternately they may come from a single pulse transmitter putting out a continuous series of pulses distributed via a pulse distributor such as a ring counter for example, in such fashion that the channel which connects the number 1 terminals will transmit only one pulse while the channel connecting the number 2 terminals will transmit two pulses, and so on.

In the example illustrated in the FIGURE 5 a pulse source is shown at 59. The source 59, which may be energized by a suitable control to go through a single cycle of operation on command after the dividend digits have been set up at the pointers $G_1$, $G'_1$ and $G''_1$, is so constructed that when thus energized it will go through a single cycle in which it delivers one pulse to a line *a*, two pulses to a line *b*, three pulses to a line *c*, four pulses to a line *d* and five pulses to a line *e*. These lines *a* to *e* are connected, as indicated in the drawing, to the terminals 20 of $G_2$, $G'_2$ and $G''_2$ so as to supply to those terminals pulses in numbers equal to the quotient values of those terminals respectively.

Thus as already explained in detail with reference to FIGURE 3 the complementary operations (1:2) not effected in each stage must, when required by the odd value of the dividend digit in such stage, be transmitted in the form of a remainder (10:2) to the switches of adjacent lower order in such fashion that to the number set up at the principal switch of said lower order there corresponds a number of pulses representative of the sub-multiple by two of the numbers so set up, augmented by 10:2, i.e., by five pulses.

To this end the interconnection switches $G_A$, $G'_A$ and $G''_A$ receive five pulses from line *e* at their wipers 26 and each time that the carry (10:2) must be effectuated, these five pulses are transmitted to the pulse totalizer of adjacent lower order where they are added to those transmitted via the auxiliary switch of that adjacent lower order. To that end the terminals 24 at odd-valued positions 1, 3, 5, 7 and 9 in each of the interconnection switches $G_A$, $G'_A$ and $G''_A$ are connected to the pulse input of the totalizator of adjacent lower order.

The operation of the apparatus is as follows: Let it be supposed that the number to be divided by 2 is 327.

The digit 3 is set-up on the principal switch $G''_1$, the digit 2 on switch $G'_1$ and 7 on the switch $G_1$.

The rotating wiper contacts 18 and 26 and the pointer 16 being within each group mounted on a common axis, the wipers of $G_2$ and $G_A$, $G'_2$ and $G'_A$, $G''_2$ and $G''_A$ take up positions corresponding to those of the pointers $G_1$, $G'_1$ and $G''_1$.

To the fourth position of $G''_1$, of value 3, there corresponds the quotient digit 1 at $G''_2$ as hereinabove explained with reference to FIGURE 3, and also the fourth terminal of $G''_A$. That is to say, the index of $G''_1$ being on the fourth terminal of $G''_1$ marked 3, the wiper of $G''_2$ will be located on the fourth terminal of $G''_2$. This fourth terminal of $G''_2$ is connected to line *a* of the system and hence receives one pulse. The pulse totalizator 64 connected to the wiper 18 of $G''_2$ therefore receives one pulse via wiper 18 of $G''_2$ and causes this number of pulses to be displayed in an appropriate manner, for example, by means of display lamps. The wiper 26 of $G''_2$ being on the fourth terminal 24 of $G''_A$, the five pulses delivered from line *e* to wiper 26 are transmitted, via a conductor 67, to the output conductor 69 of the auxiliary switch $G'_2$ of adjacent lower order. These five pulses delivered from line *e* to wiper 26 of $G''_A$ will be transmitted to the pulse totalizator 66 which receives pulses from $G'_2$.

To the third position of value 2 at $G'_1$ there corresponds a unity quotient value at $G'_2$ as hereinabove described with reference to FIGURE 3, and also the third terminal of $G'_A$. That is to say that, the index 16 of $G'_1$ being on the third terminal of $G'_1$ representative of the digit 2, the index of the auxiliary switch $G'_2$ is located on the third terminal of $G'_2$, this third terminal being connected to the channel *a* which delivers one pulse from the source 59. This pulse is transmitted to the pulse totalizator 66 connected to the output of $G'_2$. This pulse totalizator hence receives one pulse from $G'_2$ and five pulses from $G'_A$, a total of six pulses, and displays the number of pulses received in any suitable manner, for example by means of display lamps. The index of $G'_A$ being on the third terminal of $G'_A$, which is not connected to any conductor, the interconnection switch $G'_A$ will hence deliver no pulses to the output line 70 of the auxiliary switch $G_2$ of adjacent lower order.

To the digit 7 at the eighth position of $G_1$ there corresponds a quotient value of three at $G_2$ as hereinabove described with reference to FIGURE 3, and also the 8th terminal of $G_A$. That is to say that, the index 16 of $G_1$ being on the 8th terminal, representative of the digit 7, the index 18 of the auxiliary switch $G_2$ will be on the 8th terminal of the switch $G_2$, this 8th terminal being connected to the channel which delivers three pulses. These three pulses are transmitted to the pulse totalizator 68 coupled to the output of $G_2$. This totalizator having received no pulses from $G'_A$ hence receives a total of three pulses and displays the number of pulses thus received. The index of $G_A$, which is connected to channel *e*, will be disposed on its 8th terminal. The interconnection switch $G_A$ is connected at its odd-valued 2nd, 4th, 6th, 8th and 10th terminals 24 to a pulse totalizator 72 intended to display the remainder of the quotient in the units order. This totalizator 72 hence receives five pulses from the 8th terminal of $G_A$ and displays the number of pulses received.

The result displayed is hence 163.5.

From the foregoing description it will be apparent that the present invention provides apparatus for effecting, in a number system of base *n*, which may be base ten, multiplication of a plural digit number by another number *m*. The multiplier is to be understood in a generic sense as including not only, for example in the decimal system, the digits 1 to 9, but also the reciprocals 1, 1/2, . . . 1/9 thereof, whereby division may be effected in accordance with the invention. This apparatus comprises a plurality of groups of switches, one for each of a plurality of orders such as the orders C.D. and C.C. in the plural digit multiplicand number to be multiplied. Each of these groups of switches includes at least one pair of *n*-position switches such as, in FIGURES 1 and 2 the pair $G'_2$, $G'_A$ of C.D. and the pair $G''_2$, $G''_A$ of C.C., or in FIGURES 3, 4 and 5 the pairs $G_2$, $G_A$ and $G'_2$, $G'_A$. One switch $G_2$, $G'_2$ or $G''_2$ of these pairs has associated therewith means for displaying, upon energization of that one switch, one of the numbers 0, 1, 2, . . . $n-1$ according to the position of such switch. In FIGURES 1 to 4, these display means are the lamps 22 and associated indicia while in FIGURE 5 these display means are the pulse source 59, lines *a* to *e*, and totalizer or pulse counter 64 or 66. Moreover, there are associated with the other switch $G_A$, $G'_A$ or $G''_A$ of each pair means for effecting, according to the position of such other switch, energization of a selected pair of switches in a group of adjacent order. Preferably of course all switches of each group are ganged together to occupy the same position. On multiplication, this adjacent order is the next higher order whereas on division it is the next lower order. This energization is effected via conductors such as the conductors 40 and 42 of FIGURE 3 and the similar inter-order conductors shown in the other figures.

In a case of multiplication, the display means effect display for each position of the "one switch" such as $G_2$, $G'_2$ or $G''_2$, of the lowest order digit in the sum $(km+p)$ wherein *k* is the order of that position in the series 0, 1, 2, . . . $n-1$ and wherein *p* is the second lowest order digit in the corresponding sum $(km+p)$ in the adjacent lower order. In addition, in a case of multiplication, there are associated with the "other switch" $G_A$, $G_A'$ or $G_A''$ of each of these pairs means for energizing in the adjacent higher order the switches of a selected pair of switches in that adjacent higher order according to the value of the second lowest order digit in the sum $(km+p)$ first-named above.

In a case of division, the display means effect display, for each position of the "one switch" $G_2$, $G'_2$ or $G''_2$, of the units order digit in the partial quotient $(jn+k)/m$ wherein *k* is the order of that position in the series 0, 1, 2, . . . $n-1$ and wherein *j* is a number from 0 to $n-1$ equal to the remainder in the corresponding partial quotient $(jn+k)/m$ obtained in the adjacent higher order. In addition, in a case of division, there are associated with the "other switch" $G_A$, $G'_A$ or $G''_A$ of each of these pairs means for energizing in the adjacent lower order, according to the value of the remainder in said first-named partial quotient $(jn+k)/m$, the switches of the one such pair in said adjacent lower order wherein *j* is equal to said last-named remainder.

It is evident that the invention is not limited to the case where the output channels of the auxiliary switches $G_2$, $G'_2$ and $G''_2$ are connected to pulse totalizators. Such an arrangement can be applied to any system operating as a function of the number of pulses received and in which for any desired reason it is desired to divide by two the number of pulses.

It is moreover evident that the various circuits shown in FIGURES 1, 2, 3, 4 and 5, are only exemplary of the invention and that in particular the number of groups of switches is not in any way limited and that the factor of multiplication may be different from two or three. More generally, while the invention has been described herein in terms of a number of examples, the invention is not limited thereto, the scope of the invention being rather set forth in the appended claims.

We claim:

1. Apparatus for deriving in a number system of base *n* the product of a plural digit number and a factor selected from the group consisting of the numbers *m* and $1/m$, where *m* is any integer greater than zero, said apparatus comprising a plurality of groups of switches, one for each order of said plural digit number, each of said groups including at least one pair of switches having *n* positions 0, 1, 2, . . . $n-1$, the switches of each of said groups being coupled together to occupy the same position in the order 0, 1, 2, . . . $n-1$, means associated with one switch in each of said pairs to display for each position of said one switch that integral portion of the product of said plural digit number and the said factor which is of order corresponding to the order associated with said one switch, and means associated with the other switch of said pair for energizing in an adjacent order of switches a switch selected according to the value of any undisplayed portion of the product resulting from positioning of said one switch.

2. Apparatus for effecting in a number system of base $n$ the multiplication of a plural digit number by a number $m$, said apparatus comprising a plurality of groups of switches, one for each of a plurality of orders in said first number, each of said groups including at least one pair of switches each having $n$ positions 0, 1, 2, . . . $n-1$, the switches of each of said groups being coupled together to occupy the same position in the order 0, 1, 2, . . . $n-1$, means associated with one switch in each of said pairs to display for each position of said one switch, upon energization of the switches of said pair, the value of the lowest order digit in the sum $(km+p)$ wherein $k$ is the order of such position in the series 0, 1, 2, . . . $n+1$, and $p$ is the second order digit in the corresponding sum $(km+p)$ in the adjacent lower order, and means associated with the other switch of said pair for energizing a selected one of said pairs in the adjacent higher order according to the value of the second lowest order digit in the said first-named sum $(km+p)$.

3. Apparatus according to claim 2 wherein $n$ has the value ten.

4. Apparatus for effecting in a number system of base $n$ the division of a plural digit number by a number $m$, said apparatus comprising a plurality of groups of switches, one for each of a plurality of orders in said first number, each of said groups including at least one pair of switches having $n$ positions 0, 1, 2, . . . $n-1$, the switches of each of said groups being coupled together to occupy the same position in the order 0, 1, 2, . . . $n-1$, means associated with one switch in each of said pairs to display for each position of said one switch, upon energization of the switches of said pair, the value of the units order digit in the partial quotient $(jn+k)/m$ wherein $k$ is the order of said position in the series 0, 1, 2, . . . $n-1$ and wherein $j$ is a number from 0 to $n-1$ equal to the remainder in the corresponding partial quotient $(jn+k)/m$ obtained in the adjacent higher order, and means associated with the other switch of said pair for energizing in the adjacent lower order, according to the value of the remainder in said first-named partial quotient $(jn+k)/m$, the switches of the one such pair in said adjacent lower order wherein $j$ is equal to said last-named remainder.

5. Apparatus according to claim 4 wherein $n$ has the value ten.

6. Apparatus according to claim 1 wherein $n$ has the value ten.

7. Apparatus for effecting in a number system of base $n$ the multiplication of a plural digit number by another number, said apparatus comprising a plurality of groups of switches, one for each of a plurality of orders in said number, each of said groups including at least one pair of $n$-position switches, the switches of each of said groups being coupled together to occupy the same position in the order 0, 1, 2, . . . $n-1$, means associated with one switch of each of said pairs for displaying, upon energization of said one switch, one of the numbers 0, 1, 2, . . . $n-1$ according to the position of such switch, and means associated with the other switch of said pair for effecting, according to the position of said other switch, energization of a selected pair of switches in a group of adjacent order.

8. Apparatus according to claim 7 wherein $n$ has the value ten.

9. Apparatus for deriving, in a number system of base $n$, the product of a plural digit number and a factor selected from the group consisting of the numbers $m$ and $1/m$, where $m$ is any integer between 1 and $n-1$, said apparatus comprising a plurality of groups of switches, one for each of a plurality of orders in said plural digit number, each of said groups including at least one pair of $n$-position switches, the switches of each of said groups being coupled together to occupy the same position in the order 0, 1, 2, . . . $n-1$, means to supply to one switch of each of said pairs unlike numbers of pulses according to the position of said one switch, means to supply to the other switch of each of said pairs other unlike numbers of pulses according to the position of said other switch, a pulse counter connected to each of said one switches, and means coupling each of said other switches to the pulse counter connected to the said one switch in another one of said groups.

10. Apparatus according to claim 9 wherein $n$ has the value ten.

References Cited by the Examiner

UNITED STATES PATENTS

| | | | |
|---|---|---|---|
| 2,131,908 | 10/1938 | Torkelson | 235—161 |
| 2,178,951 | 11/1939 | Bryce | 235—161 |
| 2,236,794 | 4/1941 | Furber | 235—163 |
| 2,493,862 | 1/1950 | Durfee | 235—163 |
| 2,986,333 | 5/1961 | Thomas | 235—160 |
| 3,015,442 | 1/1962 | Dickinson | 235—160 |

ROBERT C. BAILEY, *Primary Examiner.*

MALCOLM A. MORRISON, IRVING L. SRAGOW, *Examiners.*

M. A. LERNER, *Assistant Examiner.*